US012172580B2

(12) United States Patent
Minjeur et al.

(10) Patent No.: US 12,172,580 B2
(45) Date of Patent: Dec. 24, 2024

(54) VEHICLE-INTEGRATED REMOVABLE STORAGE PACK

(71) Applicant: GM GLOBAL TECHNOLOGY OPERATIONS LLC, Detroit, MI (US)

(72) Inventors: Patrick Minjeur, Sterling Heights, MI (US); Lisa M. Simms, Warren, MI (US); James L. Benigni, Metamora, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 149 days.

(21) Appl. No.: 17/982,594

(22) Filed: Nov. 8, 2022

(65) Prior Publication Data

US 2024/0149796 A1     May 9, 2024

(51) Int. Cl.
*B60R 11/00*     (2006.01)

(52) U.S. Cl.
CPC ....... *B60R 11/00* (2013.01); *B60R 2011/0021* (2013.01); *B60R 2011/0071* (2013.01)

(58) Field of Classification Search
CPC ..... B60R 2011/0015; B60R 2011/0012; B60R 2011/0019; B60R 2011/0059; B60R 2011/0071; B60R 7/043; B60R 7/046
USPC ....................................................... 224/275
See application file for complete search history.

(56) References Cited

U.S. PATENT DOCUMENTS

| | | | | |
|---|---|---|---|---|
| 8,627,514 | B1 * | 1/2014 | Scoggins | B60R 7/14 2/2.5 |
| 9,907,372 | B2 * | 3/2018 | Dotey | A45C 7/0095 |
| 2009/0014602 | A1 * | 1/2009 | Frost | B60R 7/08 248/100 |
| 2009/0039128 | A1 * | 2/2009 | Damico | B60R 7/043 224/572 |
| 2015/0122159 | A1 * | 5/2015 | Valcic | B60R 7/043 108/26 |
| 2022/0097583 | A1 * | 3/2022 | Salter | B60N 3/026 |

FOREIGN PATENT DOCUMENTS

| | | | | |
|---|---|---|---|---|
| CN | 107668906 A | * | 2/2018 | |
| DE | 4433422 A1 | * | 3/1996 | B60R 13/02 |
| EP | 1642777 A1 | * | 4/2006 | B60R 5/006 |

* cited by examiner

*Primary Examiner* — Scott T McNurlen
(74) *Attorney, Agent, or Firm* — CANTOR COLBURN LLP

(57) ABSTRACT

A vehicle comprising having a door with an interior surface is provide. The interior surface of the door includes a first plurality of clips. The vehicle also includes a removable storage pack having a plurality of pockets for storing items and a second plurality of clips configured to selectively engage with the first plurality of clips to removably affix the removable storage pack to the interior surface of the door.

13 Claims, 5 Drawing Sheets

VEHICLE-INTEGRATED REMOVABLE STORAGE PACK

INTRODUCTION

The disclosure relates to vehicle storage. More specifically, the disclosure relates to a removable storage pack that is integrated into a vehicle.

Vehicles typically include multiple types of storage for individuals to use, such as a center console, one or more door pockets, and the like. When individuals get into a vehicle they may remove multiple items, such as a wallet, keys, smartphone, and the like from their pockets and place these items in various available storage locations. Likewise, when the individual gets out of the vehicle, they must gather their items from the various storage locations. Gathering up these items from the disparate available storage locations can take time and slow down the egress of the individual from the vehicle. In addition, in some cases, one or more of the items are accidentally left behind in the vehicle.

SUMMARY

In one exemplary embodiment, a vehicle is provided. The vehicle includes a door having an interior surface and a first plurality of clips disposed on the interior surface of the door. The vehicle also includes a removable storage pack having a plurality of pockets for storing items and a second plurality of clips configured to selectively engage with the first plurality of clips to removably affix the removable storage pack to the interior surface of the door.

In addition to the one or more features described herein the interior surface of the door comprises a wireless charging surface configured to at least partially overlap one of the plurality of pockets of the removable storage pack when the removable storage pack is affixed to the interior surface of the door.

In addition to the one or more features described herein the wireless charging surface is configured to wirelessly charge an electronic device stored in the at least one of the plurality of pockets.

In addition to the one or more features described herein the second plurality of clips is configured to selectively engage with one another to removably affix the removable storage pack to an individual.

In addition to the one or more features described herein one or more of the second plurality of clips are disposed on adjustable straps connected to the removable storage pack.

In addition to the one or more features described herein the adjustable straps are configured to adjust a fit of the removable storage pack to an individual when the removable storage pack is affixed to the individual.

In addition to the one or more features described herein the adjustable straps are slidably affixed to the removable storage pack via adjustable clamps that are configured to permit the adjustable straps to move in an up/down direction to further customize the fit of the removable storage pack to the individual.

In addition to the one or more features described herein the interior surface of the door includes one or more hooks that are configured to engage with one or more loops of the removable storage pack to removably affix the removable storage pack to the interior surface of the door.

In one exemplary embodiment, a vehicle is provided. The vehicle includes an interior surface and a first plurality of clips disposed on the interior surface. The vehicle also includes a removable storage pack having a plurality of pockets for storing items and a second plurality of clips configured to selectively engage with the first plurality of clips to removably affix the removable storage pack to the interior surface.

In addition to the one or more features described herein the interior surface comprises a wireless charging surface configured to at least partially overlap one of the plurality of pockets of the removable storage pack when the removable storage pack is affixed to the interior surface.

In addition to the one or more features described herein the wireless charging surface is configured to wirelessly charge an electronic device stored in the at least one of the plurality of pockets.

In addition to the one or more features described herein the second plurality of clips is configured to selectively engage with one another to removably affix the removable storage pack to an individual.

In addition to the one or more features described herein one or more of the second plurality of clips are disposed on adjustable straps connected to the removable storage pack.

In addition to the one or more features described herein the adjustable straps are configured to adjust a fit of the removable storage pack to an individual when the removable storage pack is affixed to the individual.

In addition to the one or more features described herein the adjustable straps are slidably affixed to the removable storage pack via adjustable clamps that are configured to permit the adjustable straps to move in an up/down direction to further customize the fit of the removable storage pack to the individual.

In addition to the one or more features described herein the interior surface includes one or more hooks that are configured to engage with one or more loops of the removable storage pack to removably affix the removable storage pack to the interior surface.

In addition to the one or more features described herein the interior surface is disposed on a rear portion of a driver's seat.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

Turning now to an overview of the aspects of the disclosure, embodiments of the disclosure include a storage pack that is removably affixed to the interior of a vehicle. In exemplary embodiments, when affixed to the interior of a vehicle the storage pack is integrated with the trim of the vehicle such that the compartments of the storage pack are accessible. The storage pack is configured to be worn by an individual when it is not affixed to the interior of the vehicle. In exemplary embodiments, the removable storage pack enables an individual to quickly egress from the vehicle without having to gather their belongings from multiple storage locations.

Figure 1:
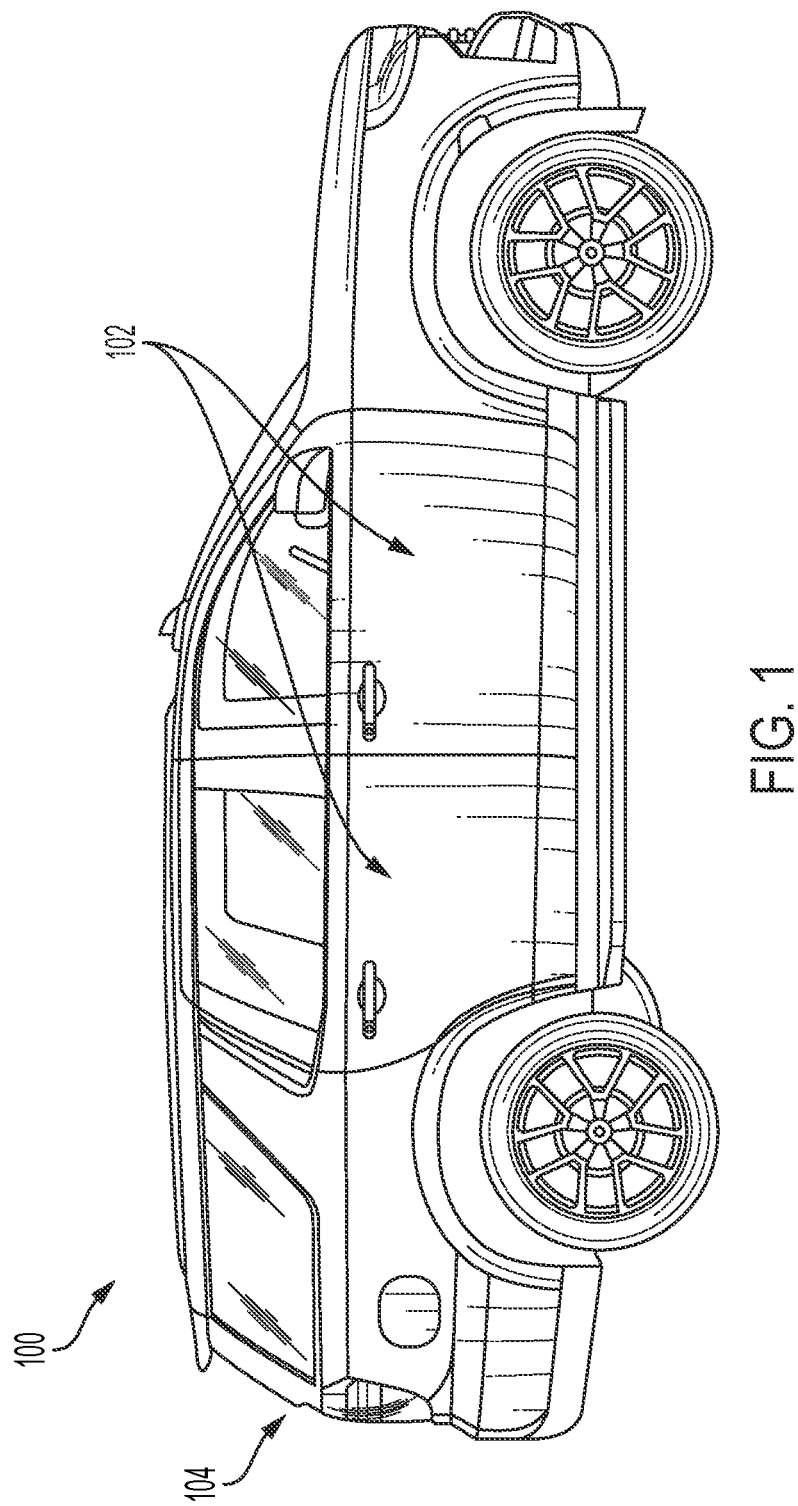
FIG. 1 is a schematic diagram of a vehicle for use in conjunction with one or more embodiments of the present disclosure.

Referring now to FIG. 1, a schematic diagram of a vehicle 100 for use in conjunction with one or more embodiments of the present disclosure is shown. The vehicle 100 includes a plurality of doors 102 that are used for occupant/driver ingress and egress from the vehicle 100. In one embodiment, the vehicle 100 also includes a hatchback 104 that is used to access a storage area of the vehicle 100.

Figure 2A:
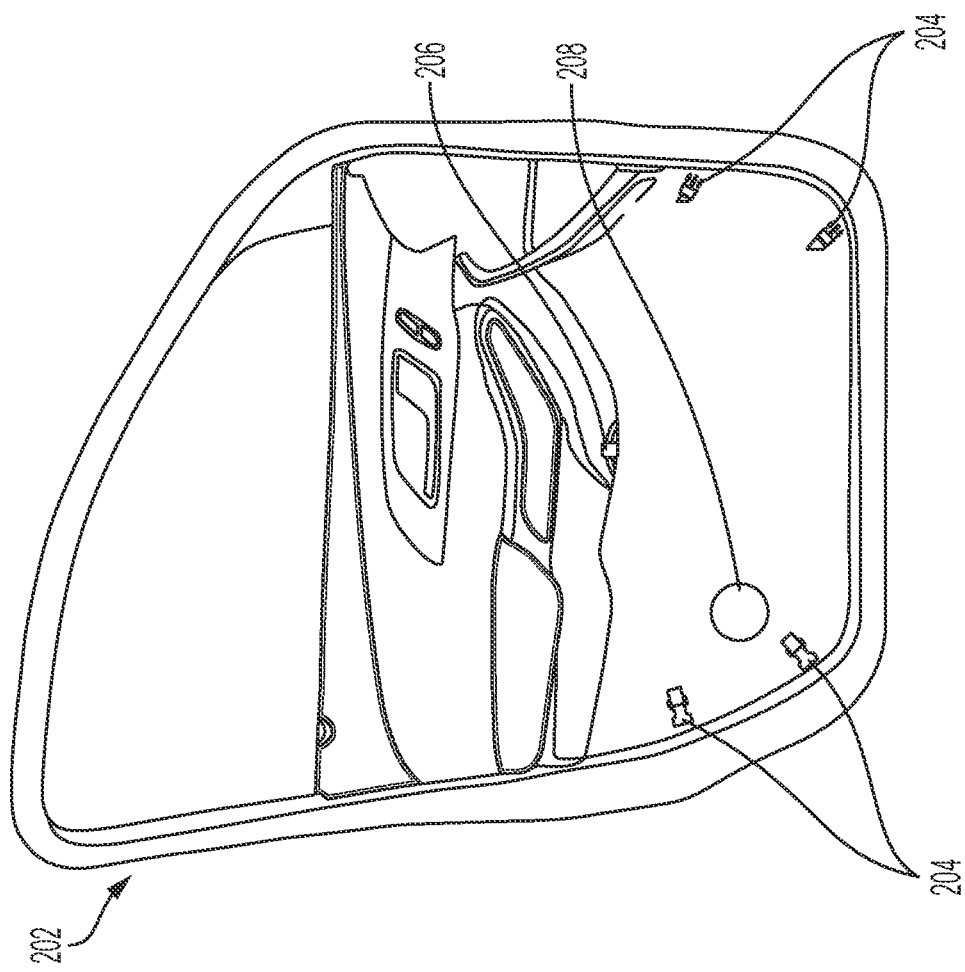
FIG. 2A is a schematic diagram of an interior of a door of a vehicle in accordance with an exemplary embodiment

Referring now to FIG. 2A, a schematic diagram of an interior of a door 202 of a vehicle in accordance with an exemplary embodiment is shown. As illustrated, the door 202 includes a plurality of clips 204 and a hook 206 that are configured to selectively attach a removable pack (not shown) to the door 202. In one embodiment, the door 202 also includes a wireless charging surface 208 that is configured to wirelessly charge capable electronic devices that are disposed within proximity of the wireless charging surface 208.

Figure 2B:
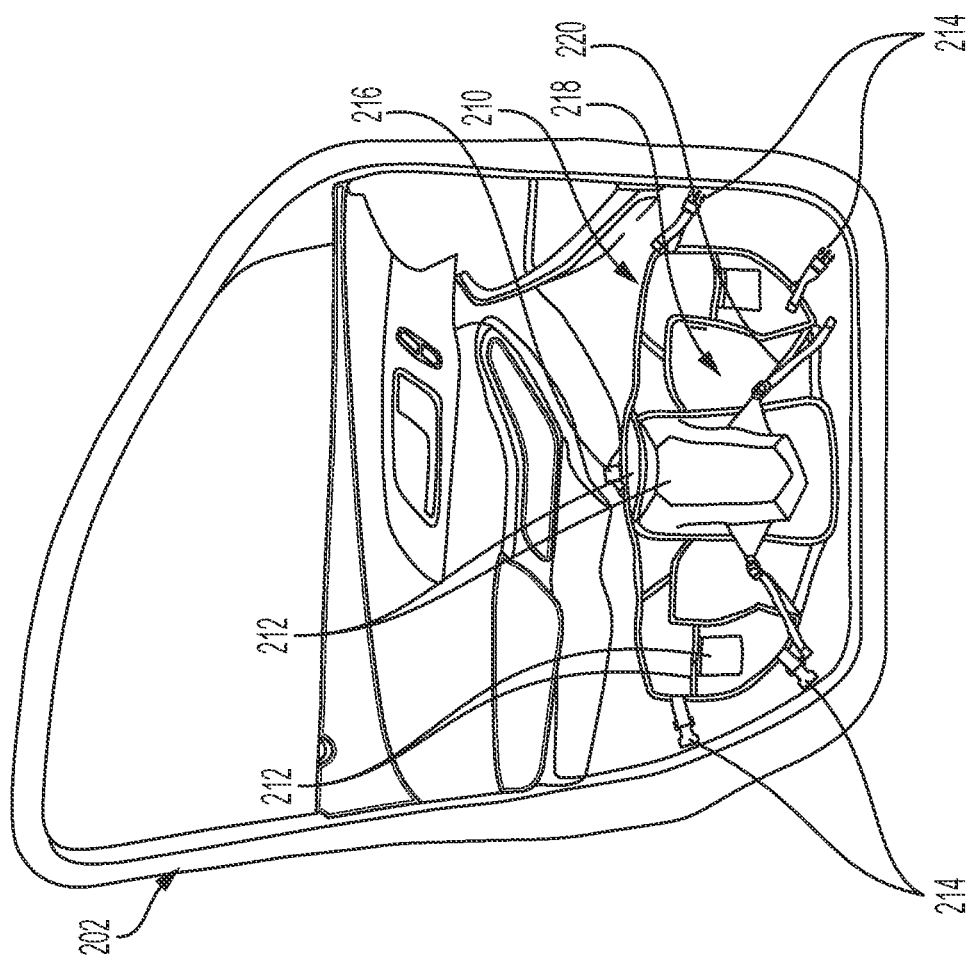
FIG. 2B is a schematic diagram of an interior of a door of a vehicle having a removable storage pack in accordance with an exemplary embodiment.

Referring now to FIG. 2B, a schematic diagram of an interior of a door 202 of a vehicle having a removable storage pack 210 in accordance with an exemplary embodiment is shown. The removable storage pack 210 includes a plurality of clips 214 that are configured to engage with the clips 204, shown in FIG. 2A, to affix the removable storage pack 210 to the door 202. The removable storage pack 210 also includes a loop 216 that is configured to engage with the hook 206, shown in FIG. 2A, to affix the removable storage pack 210 to the door 202. In one embodiment, the removable storage pack 210 includes one or more adjustable straps 220 that are configured to selectively control the size of openings 218 of the removable storage pack 210. In one embodiment, the openings 218 are configured to receive arms of an individual when the removable storage pack 210 is worn by the individual.

The removable storage pack 210 includes a plurality of pockets 212 that are configured to hold items such as phones, wallets, keys, water bottles, etc. In exemplary embodiments, pockets 212 are accessible to an individual inside the vehicle when the removable storage pack 210 is affixed to the door 202. In one embodiment, at least one of the pockets 212 is configured to at least partially overlap with the wireless charging surface 208, shown in FIG. 2A, when the removable storage pack 210 is affixed to the door 202. As a result, an electronic device placed in a pocket that overlaps the wireless charging surface 208, can be wirelessly charged while stored in the pocket 212.

Figure 3:
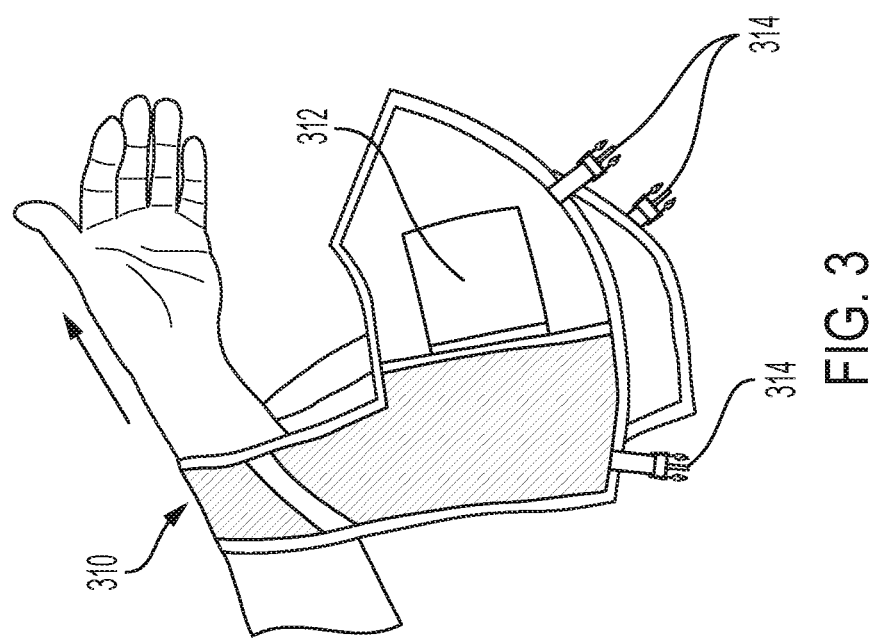
FIG. 3 is a schematic diagram a removable storage pack in accordance with an exemplary embodiment.

Referring now to FIG. 3 a schematic diagram of a removable storage pack 310 in accordance with an exemplary embodiment is shown. As illustrated, the removable storage pack 310 has been disengaged from the door of a vehicle and is being held by a user. The removable storage pack 310 includes a pocket 312 that is configured to hold one or more items such as phones, wallets, keys, water bottles, etc. The removable storage pack 310 also includes a plurality of clips 314 that are configured to selectively engage with one another and with the clips 204, shown in FIG. 2A.

Figure 4:
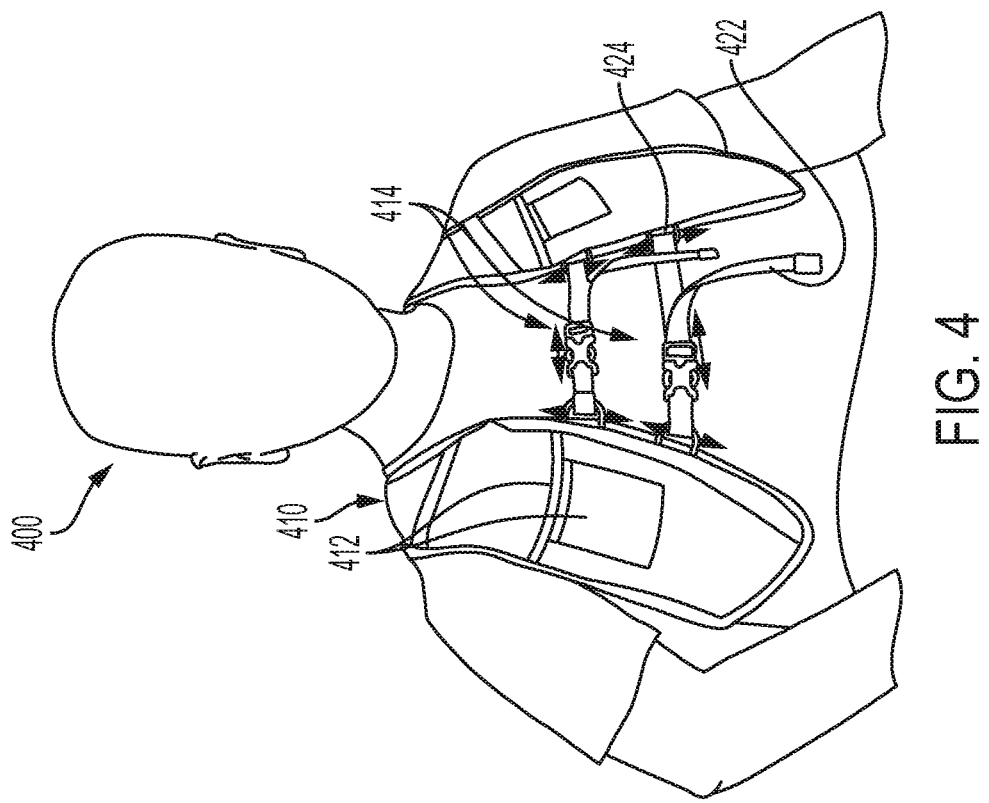
FIG. 4 is a schematic diagram of an individual wearing a removable storage pack in accordance with an exemplary embodiment.

Referring now to FIG. 4 a schematic diagram of an individual 400 wearing a removable storage pack 410 in accordance with an exemplary embodiment is shown. As illustrated, the removable storage pack 410 includes a plurality of pockets 412 that are configured to hold items such as phones, wallets, keys, water bottles, etc. In exemplary embodiments, the pockets 412 are accessible to an individual 400 while wearing the removable storage pack 410.

The removable storage pack 410 includes a plurality of clips 414 that are configured to selectively engage with one another to secure the removable storage pack 410 to the individual 400. In exemplary embodiments, the clips 414 are disposed on adjustable straps 422 that are configured to adjust the fit of the removable storage pack 410 to the individual 400. In one embodiment, the adjustable straps 422 are slidably affixed to the removable storage pack 410 via adjustable clamps 424 that are configured to permit the adjustable straps 422 to selectively move in an up/down direction to further customize the fit of the removable storage pack 410 to the individual 400.

In exemplary embodiments, the removable storage pack is configured to provide an accessible storage solution to an individual that can be utilized both inside a vehicle and outside of the vehicle. When the removable storage pack is positioned inside a vehicle, it provides pockets of various sizes for miscellaneous items in an easily accessible location. When taken out of the vehicle, the clips that secure the inside a vehicle to the vehicle are used as chest clips for the individual to use as a backpack. As a result, an individual can quickly and easily transition to and from being inside the vehicle without having to gather their belongings. The removable storage pack can be customized in a variety of sizes and colors to accommodate user preferences and sizes.

Although shown as affixed to an interior surface of a vehicle door, the removable storage pack can be designed into the seatback trim of a vehicle, or into other suitable locations within a vehicle. In one embodiment, the removable storage pack is configured to affix the rear surface of a driver's seat of the vehicle and includes pockets configured to hold diapers, wipes, etc. for parents of young children.

In exemplary embodiments, means other than mechanical clips may be used to secure the removable storage pack to the interior of the vehicle. For example, the clips may be replaced with one or more magnets that removable secure the removable storage pack to the interior of the vehicle when in the stowed position. In addition, the magnets are configured to affix to one another to secure the removable storage pack to a user when in the un-stowed position.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A vehicle comprising:
   a door having an interior surface;
   a first plurality of clips disposed on the interior surface of the door; and
   a removable storage pack having a plurality of pockets for storing items and a second plurality of clips configured to selectively engage with the first plurality of clips to removably affix the removable storage pack to the interior surface of the door,
   wherein one or more of the second plurality of clips are disposed on adjustable straps connected to the removable storage pack and wherein the adjustable straps are slidably affixed to the removable storage pack via adjustable clamps that are configured to permit the adjustable straps to move in an up/down direction.

2. The vehicle of claim 1, wherein the interior surface of the door comprises a wireless charging surface configured to at least partially overlap one of the plurality of pockets of the removable storage pack when the removable storage pack is affixed to the interior surface of the door.

3. The vehicle of claim 2, wherein the wireless charging surface is configured to wirelessly charge an electronic device stored in the at least one of the plurality of pockets.

4. The vehicle of claim 1, wherein the second plurality of clips is configured to selectively engage with one another to removably affix the removable storage pack to an individual.

5. The vehicle of claim 1, wherein the adjustable straps are configured to adjust a fit of the removable storage pack to an individual when the removable storage pack is affixed to the individual.

6. The vehicle of claim 1, wherein the interior surface of the door includes one or more hooks that are configured to engage with one or more loops of the removable storage pack to removably affix the removable storage pack to the interior surface of the door.

7. A vehicle comprising:
   an interior surface;
   a first plurality of clips disposed on the interior surface; and
   a removable storage pack having a plurality of pockets for storing items and a second plurality of clips configured to selectively engage with the first plurality of clips to removably affix the removable storage pack to the interior surface,
   wherein one or more of the second plurality of clips are disposed on adjustable straps connected to the removable storage pack and wherein the adjustable straps are slidably affixed to the removable storage pack via adjustable clamps that are configured to permit the adjustable straps to move in an up/down direction.

8. The vehicle of claim 7, wherein the interior surface comprises a wireless charging surface configured to at least partially overlap one of the plurality of pockets of the removable storage pack when the removable storage pack is affixed to the interior surface.

9. The vehicle of claim 8, wherein the wireless charging surface is configured to wirelessly charge an electronic device stored in the at least one of the plurality of pockets.

10. The vehicle of claim 7, wherein the second plurality of clips is configured to selectively engage with one another to removably affix the removable storage pack to an individual.

11. The vehicle of claim 7, wherein the adjustable straps are configured to adjust a fit of the removable storage pack to an individual when the removable storage pack is affixed to the individual.

12. The vehicle of claim 7, wherein the interior surface includes one or more hooks that are configured to engage with one or more loops of the removable storage pack to removably affix the removable storage pack to the interior surface.

13. The vehicle of claim 7, wherein the interior surface is disposed on a rear portion of a driver's seat.

* * * * *